United States Patent
Ando

(10) Patent No.: US 11,502,371 B2
(45) Date of Patent: Nov. 15, 2022

(54) BATTERY UNIT, BATTERY MODULE, AND BATTERY PACK

(71) Applicant: TOYOTA JIDOSHA KABUSHIKI KAISHA, Toyota (JP)

(72) Inventor: Sho Ando, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/308,496

(22) Filed: May 5, 2021

(65) Prior Publication Data

US 2021/0384585 A1    Dec. 9, 2021

(30) Foreign Application Priority Data

Jun. 4, 2020    (JP) .............................. JP2020-097341

(51) Int. Cl.
*H01M 50/00*    (2021.01)
*H01M 50/392*   (2021.01)
*H01M 50/342*   (2021.01)

(52) U.S. Cl.
CPC ....... *H01M 50/392* (2021.01); *H01M 50/342* (2021.01)

(58) Field of Classification Search
CPC ............. H01M 50/471; H01M 50/392; H01M 50/342; H01M 50/502; Y02E 60/10
See application file for complete search history.

(56) References Cited

U.S. PATENT DOCUMENTS

| 2010/0104928 | A1  | 4/2010  | Nishino et al. |
| 2017/0125759 | A1* | 5/2017  | Silkowski ................. A62C 3/16 |
| 2017/0170439 | A1* | 6/2017  | Jarvis ..................... H01M 50/30 |
| 2018/0287127 | A1* | 10/2018 | Onnerud ................. B60L 50/64 |

FOREIGN PATENT DOCUMENTS

| JP | 2008-117765 A | 5/2008 |
| JP | 2017-091762 A | 5/2017 |

* cited by examiner

*Primary Examiner* — Cynthia H Kelly
*Assistant Examiner* — Monique M Wills
(74) *Attorney, Agent, or Firm* — Sughrue Mion, PLLC

(57) ABSTRACT

A battery unit includes a secondary battery, a first trap, and a second trap. The secondary battery includes a battery case provided with a gas vent valve, and an electrolyte solution enclosed in the battery case. The first trap includes a mesh material disposed outside the battery case so as to oppose and cover the gas vent valve. The second trap includes a liquid retaining material made of a non-flammable material and disposed further outward of the first trap so as to oppose and cover the gas vent valve.

17 Claims, 3 Drawing Sheets

BATTERY UNIT, BATTERY MODULE, AND BATTERY PACK

CROSS REFERENCE TO RELATED APPLICATIONS

The present application claims priority from Japanese Patent Application No. 2020-097341 filed on Jun. 4, 2020, which is incorporated by reference herein in its entirety.

BACKGROUND

The present disclosure relates to a battery unit, a battery module, and a battery pack.

JP 2017-091762 A discloses a cell structure in which an electrode material capturing filter and an electrolyte solution-absorbing member are disposed directly under a safety valve that is provided above a battery cell inside a battery cell case. The electrolyte solution-absorbing member is disposed between the capturing filter and the safety valve. The publication discloses that such a battery cell is able to prevent the electrolyte solution that exists outside the electrode assembly from spraying out of the case even when the safety valve opens.

JP 2008-117765 discloses a battery pack in which a battery is enclosed in a housing and that has a path for flowing a gas released from the battery. The battery pack is configured so as to lower the temperature of the gas in the path and discharge the gas to the outside. The path includes a bent portion for bending the flow direction of the gas. Because of this, when sparks are generated from the gas, it is possible to separate the direction in which the gas flows and the direction in which sparks are ejected. It is stated that, as a result, it is possible to prevent the gas from flowing with sparks, and it is possible to prevent the gas from leading to combustion. It is also disclosed that a spark trap unit is provided in the path.

An exhaust duct (1C) of the battery pack disclosed in the publication includes a connection pipe part (1H), a main pipe part (1I), a gas cooling part (1L), a spark trap unit (1M), and an exhaust port (1P). Such a configuration is shown in, for example, FIGS. 1 to 3 of the publication. The reference characters in parentheses are the reference characters indicated in the publication. The spark trap unit (1M) is disposed adjacent to the gas cooling part (1L). It is disclosed that, as the spark trap unit (1M), a porous ceramic plate, a gel sheet, a copper mesh, an aluminum mesh, a SUS mesh, a cement plate, or a plaster plate is provided on the inner wall surface, in order to trap sparks in the gas. With the battery pack disclosed in the publication, the gas exhausted from the battery is introduced from the connection pipe part (1H) to the main pipe part (1I), and after passing through the main pipe part (1I), the gas is passed through the gas cooling part (1L). Thereafter, the gas is passed through the spark trap unit (1M) and discharged through the exhaust port (1P) to the outside of the housing.

SUMMARY

An assembled battery in which a plurality of secondary batteries are combined may be used for the electric power source for driving vehicles, which requires high power. The plurality of secondary batteries are connected by a bus bar to make up a battery module. Further, a plurality of battery modules may be enclosed in a pack case to make up a battery pack. For the battery pack accommodating a plurality of battery modules, it is desired to improve safety against thermal runaway that propagates between a plurality of batteries within the battery pack, which originates from the thermal runaway of one of the cells.

A battery unit disclosed herein includes a secondary battery, a first trap, and a second trap. The secondary battery includes a battery case provided with a gas vent valve, and an electrolyte solution enclosed in the battery case. The first trap includes a mesh material disposed outside the battery case so as to oppose and cover the gas vent valve. The second trap includes a liquid retaining material made of a non-flammable material and disposed further outward of the first trap so as to oppose and cover the gas vent valve.

In the just-described battery unit, the first trap and the second trap serve to prevent scattering of the sparks and the electrolyte solution contained in the gas that is ejected when the gas vent valve is opened. As a result, it is possible to improve safety against propagation of thermal runaway that occurs between batteries.

From the viewpoint of improving safety, it is possible that the first trap may have an aperture ratio of, for example, from 25% to 75%. The second trap may include one of a spongy material, a mineral wool material, a diatomaceous earth, and a fibrous material. The first trap may be disposed away from the gas vent valve. The second trap may be disposed away from the first trap. The first trap may be supported on the battery case or the second trap. The second trap may be supported on the first trap or the battery case.

In another embodiment, a battery module disclosed herein includes a plurality of secondary batteries, a restraining member, bus bars, a first trap, and a second trap. Each of the plurality of secondary batteries includes a battery case provided with a gas vent valve, an electrolyte solution enclosed in the battery case, a positive electrode terminal disposed on a side surface of the battery case, and a negative electrode terminal disposed on the side surface of the battery case. The restraining member restrains the plurality of secondary batteries in a predetermined arrangement. Each of the bus bars connects one of the positive electrode terminals and one of the negative electrode terminals between the plurality of secondary batteries. The first trap includes a mesh material disposed outside the battery case of each of the plurality of secondary batteries so as to oppose and cover the gas vent valve of each of the plurality of secondary batteries. The second trap includes a liquid retaining material made of a non-flammable material and disposed further outward of the first trap so as to oppose and cover the gas vent valve of each of the plurality of secondary batteries.

In the just-described battery module, the first trap and the second trap serve to prevent scattering of the electrolyte solution and the sparks that are contained in the gas that is ejected when the gas vent valve is opened. As a result, it is possible to improve safety against the thermal runaway that originates from one of the secondary batteries and propagates to other secondary batteries in the battery module.

Herein, it is possible that the first trap may have an aperture ratio of from 25% to 75%. The second trap may include one of a spongy material, a mineral wool material, a diatomaceous earth, and a fibrous material. The first trap may be disposed away from the gas vent valve of each of the plurality of secondary batteries. The second trap may be disposed away from the first trap. The first trap may be supported on at least one of the restraining member, the bus bars, the second trap, and any of the battery cases of the plurality of secondary batteries. The second trap may be supported on at least one of the first trap, the restraining member, the bus bars, and any of the battery cases of the plurality of secondary batteries.

In another embodiment according to the present disclosure, a battery pack may include one or more battery modules, and a pack case enclosing the one or more battery modules in a predetermined arrangement. The first trap may be supported on at least one of the restraining member, the bus bars, the pack case, the second trap, and any of the battery cases of the plurality of secondary batteries. The second trap may be supported on at least one of the restraining member, the bus bars, the pack case, the first trap, and any of the battery cases of the plurality of secondary batteries.

In the just-described battery pack, the first trap and the second trap serve to prevent scattering of the electrolyte solution and the sparks that are contained in the gas that is ejected when the gas vent valve is opened. As a result, it is possible to improve safety against the thermal runaway that originates from one of the secondary batteries and propagates to other secondary batteries in the battery pack.

DETAILED DESCRIPTION

Figure 1:
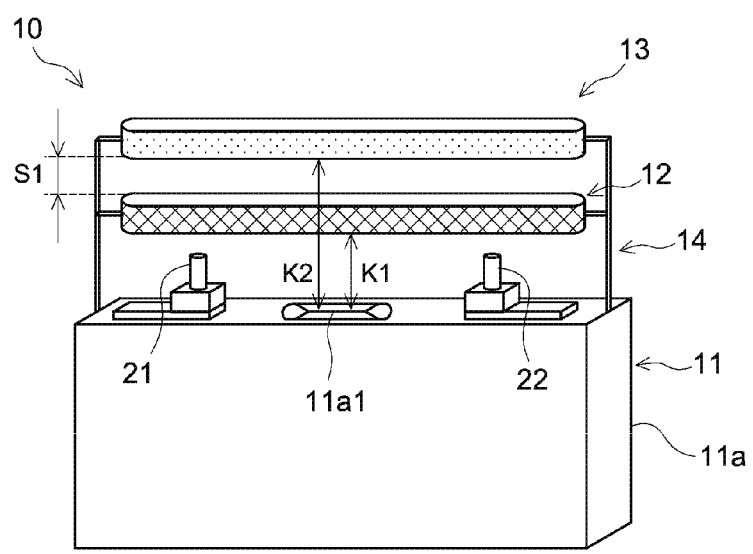
FIG. 1 is a schematic view illustrating a battery unit 10 disclosed herein.
Figure 2:
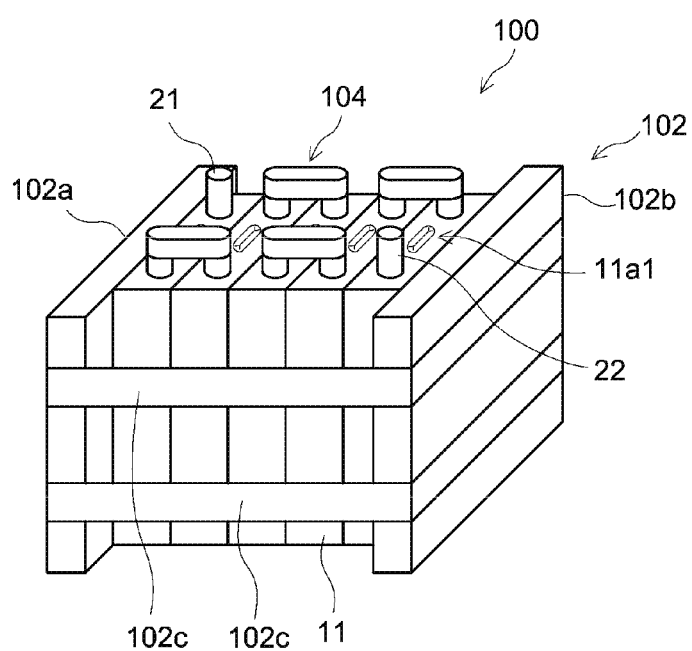
FIG. 2 is a schematic view illustrating a battery module 100.
Figure 3:
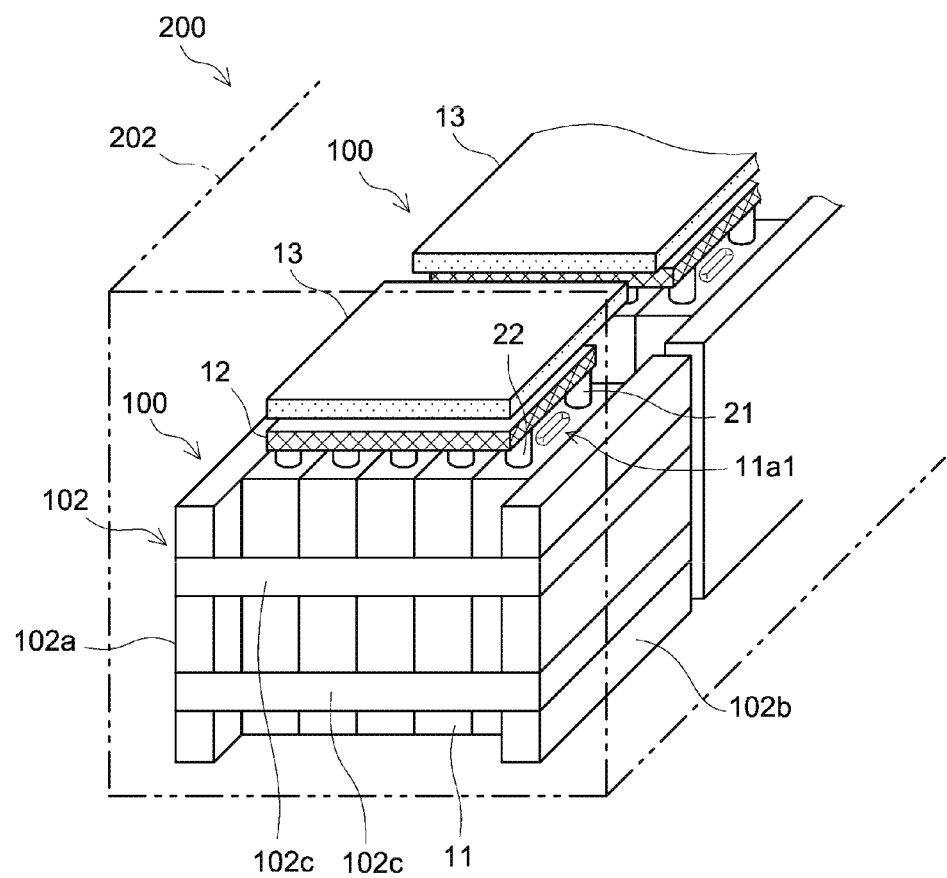
FIG. 3 is a schematic view illustrating a battery pack 200.

The following description illustrates embodiments of a battery unit, a battery module, and a battery pack according to the present disclosure. It should be noted, however, that the embodiments described herein are, of course, not intended to limit the present invention. The present invention is not limited to the embodiments described herein unless specifically stated otherwise.
Battery Unit 10
FIG. 1 is a schematic view illustrating a battery unit 10 disclosed herein. As illustrated in FIG. 1, the battery unit 10 includes a secondary battery 11, a first trap 12, and a second trap 13.
Secondary Battery 11
The secondary battery 11 includes a battery case 11a and an electrolyte solution. The secondary battery 11 may be, for example, a non-aqueous electrolyte secondary battery. In the secondary battery 11, an electrode assembly and an electrolyte solution are enclosed inside the battery case 11a. The battery case 11a is provided with a gas vent valve 11a1. In this embodiment, the battery case 11a is what is called a prismatic case, which is in a substantially rectangular parallelepiped shape. A positive electrode terminal 21 and a negative electrode terminal 22 are attached to the battery case 11a.
Gas Vent Valve 11a1
The gas vent valve 11a1 is designed so that, when a large amount of gas is generated inside the battery case 11a and the internal pressure is raised, it breaks to form an opening before any other portion of the battery case 11a breaks. The gas vent valve 11a1 of the battery case 11a opens when the internal pressure of the battery case 11a increases to a certain degree. This prevents the internal pressure of the battery case 11a from becoming higher than a certain pressure.
Battery Module 100
FIG. 2 is a schematic view illustrating a battery module 100. FIG. 3 is a schematic view illustrating a battery pack 200. In FIG. 2, the first trap 12 and the second trap 13 are not shown. As illustrated in FIG. 2, the battery module 100 includes a plurality of secondary batteries 11, a restraining member 102, and bus bars 104.

The plurality of secondary batteries 11 that make up the battery module 100 each includes a battery case 11a including a gas vent valve 11a1. Although not shown in the drawings, each of the battery cases 11a accommodates an electrode assembly and an electrolyte solution. Each of the battery cases 11a is provided with a positive electrode terminal 21 and a negative electrode terminal 22. In the battery module 100, the plurality of secondary batteries 11 are arranged as shows in FIG. 2. In the embodiment shown in FIG. 2, each of the plurality of secondary batteries 11 includes a prismatic battery case 11a. The plurality of secondary batteries 11 are arranged so that the wide side surfaces of the prismatic battery cases 11a are opposed to each other in a face-to-face relationship.

The gas vent valve 11a1 is disposed on one side surface of the battery case 11a. The plurality of secondary batteries 11 are arranged in such a manner that the orientations of the battery cases 11a are aligned so that the gas vent valves 11a1 face in the same direction. Although not shown in the drawings, spacers may be disposed between the plurality of secondary batteries 11. The spacers may also have a function to form a flow passage for refrigerant or a function to thermally insulate the secondary batteries 11, for example.

The restraining member 102 restrains the plurality of secondary batteries 11 of the battery module 100. In the embodiment shown in FIG. 2, the restraining member 102 includes restraining plates 102a and 102b that are attached to opposite ends of the arranged plurality of secondary batteries 11. The restraining plates 102a and 102b are held by restraining belts 102c spanning therebetween. A tension is applied to the restraining belts 102c so that a predetermined restraining pressure acts on the plurality of secondary batteries 11 that make up the battery module 100.

Each of the bus bars 104 electrically connects a positive electrode terminal 21 and a negative electrode terminal 22 between a plurality of secondary batteries 11 of the battery module 100. In other words, the bus bars 104 electrically connect the plurality of secondary batteries 11 of the battery module 100. The plurality of secondary batteries 11 of the battery module 100 may be connected in series, for example.
Battery Pack 200
A battery pack 200 includes one or more battery modules 100, and a pack case 202 enclosing the one or more battery modules 100 in a predetermined arrangement. The pack case 202 may be a case that has an appropriate mechanical strength. The pack case 202 may enclose, for example, a cooling device such as a cooling fan, a refrigerant circulation device, a controller device for controlling charge and discharge of the battery modules 100 in the battery pack 200, and sensors for acquiring current values, voltage values, and temperatures of the battery modules 100 in the battery pack 200.

Herein, the gas vent valve 11a1 is designed so that, when a large amount of gas is generated inside the battery case 11a and the internal pressure is raised, it breaks to form an opening before any other portion of the battery case 11a breaks. When the gas vent valve 11a1 is opened, gas may be ejected violently from the gas vent valve 11a1. It is possible that when the gas vent valve 11a1 is opened, it may involve heat generation of the secondary batteries 11. As a consequence, the gas ejected out of the gas vent valve 11a1 may contain evaporated electrolyte solution. The electrolyte solution contained in the ejected gas may be in a mist state. Various kinds of preventive measures are taken to prevent the electrolyte solution from catching fire. However, it is desired to prevent the electrolyte solution that is ejected from the gas vent valve 11a1 from being sprayed inside the case of the battery pack, from the viewpoint of improving safety.

Moreover, it may be assumed that penetration of a sharp metal piece at the time of a vehicle collision, for example, may become a cause of gas formation inside the battery case 11a. As a test that assumes such an event, it is possible to employ a nail penetration test, for example, in which a nail penetrates into a battery. In the nail penetration test, a nail is stuck into the battery case 11a so as to penetrate the electrode assembly. The nail penetration test causes a short circuit between the positive electrode and the negative electrode enclosed inside the battery case 11a. Thus, the nail penetration test may be employed as the testing for intentionally causing a short circuit between the positive electrode and the negative electrode of the electrode assembly enclosed inside the battery case. Furthermore, when the secondary battery 11 is sufficiently charged, there is a significant potential difference between the positive electrode and the negative electrode. In such an event that involves a short circuit between the positive electrode and the negative electrode with a significant potential difference, it may be assumed that heat is generated violently because of the short circuit and gas is formed violently inside the battery case 11a. For that reason, the nail penetration test may be carried out for a battery that is in an overcharged state (for example, for a battery that is charged to equal to or higher than 100% SOC). Note that the term "SOC" means the state of charge.

For the secondary battery 11, various preventive measures have been proposed for preventing heat generation of the secondary battery 11, such as a structure in which the separator interposed between the positive electrode and the negative electrode is melted to close the openings to shut down the reaction associated with the short circuit. Also, it is investigated to employ a flame-resistant solvent for the electrolyte solution. However, herein, the battery case 11a is not damaged significantly because the gas vent valve 11a1 opens even when a short circuit occurs between the positive electrode and the negative electrode of the electrode assembly enclosed inside the battery case 11a and gas formation takes place violently inside the battery case 11a. On the other hand, in the case where the gas vent valve 11a1 is opened, it means that a large amount of gas is generated inside the battery case 11a and the internal pressure is increased. As a consequence, the gas is ejected from the gas vent valve 11a1 violently. The gas is ejected together with the electrolyte solution. When a short circuit occurs inside the battery case 11a, sparks may also be caused. Consequently, it is possible that the gas ejected from the gas vent valve 11a1 may be accompanied by sparks.

First Trap 12

The first trap 12 is disposed outside the battery case 11a so as to oppose and cover the gas vent valve 11a1. The first trap 12 is composed of a mesh material. Thus, the first trap 12 may be configured to permit passage of the gas and to be able to trap sparks when the gas accompanies the sparks. For example, the aperture ratio of the first trap 12 may be adjusted so as to obtain such a function.

Thus, the first trap 12 may be configured to permit passage of the gas and to be able to trap sparks when the gas accompanies sparks. From such a viewpoint, it is possible that the aperture ratio of the first trap 12 may be, for example, greater than or equal to 25%, preferably greater than or equal to 40%. On the other hand, the aperture ratio of the first trap 12 may be less than or equal to 75%, preferably less than or equal to 60%. The first trap 12 is not limited to a mesh material in a rectangular lattice shape. The first trap 12 may be, for example, a mesh material in a hexagonal lattice shape. The aperture ratio of the first trap 12 is defined as the proportion of the area of the openings with respect to the entire mesh. Thus, the first trap 12 may be one that permits gas to be discharged from the gas vent valve 11a1 and also to be able to trap the sparks when the gas discharged from the gas vent valve 11a1 contains sparks. An appropriate mesh material that is suitable for the purposes may be selected for the first trap 12. Unless specifically stated otherwise, the aperture ratio, the thickness, and the like of the mesh material used for the first trap 12 are not limited specifically.

Herein, it is possible to use a metal mesh for the first trap 12, for example. In this case, it is possible to use a mesh made of a metal such as aluminum, copper, stainless steel, brass, and Inconel. Alternatively, a mesh material made of heat-resistant ceramic may be used for the first trap 12.

Moreover, the first trap 12 may be disposed so as not to inhibit the gas vent valve 11a1 of the battery case 11a from opening. For example, the first trap 12 may be disposed away from the gas vent valve 11a1 to such an extent that it does not inhibit the gas vent valve 11a1 from opening. For example, the first trap 12 may be supported on the battery case 11a. More specifically, the first trap 12 may be mounted onto a positive electrode terminal or a negative electrode terminal attached to the battery case 11a.

As illustrated in FIG. 2, in the battery module 100, the first trap 12 may be disposed outside the battery case 11a of each of the plurality of secondary batteries 11 in the battery module 100 so as to oppose and cover the gas vent valve 11a1. In this case as well, the first trap 12 may be composed of a mesh material. Moreover, the first trap 12 may be disposed distally from the gas vent valve 11a1 of the plurality of secondary batteries 11. Thus, the first trap 12 does not obstruct the gas vent valves 11a1 when each of the gas vent valves 11a1 of the plurality of secondary batteries 11 opens.

Moreover, in the battery module 100, the first trap 12 may be supported on at least one of the battery cases 11a, the restraining member 102, and the bus bars 104. In other words, the first trap 12 may be supported on the restraining member 102, the bus bars 104, and so forth, not just on the battery cases 11a. Furthermore, as illustrated in FIG. 3, in the battery pack 200, the first trap 12 may be further attached to the pack case 202.

In this embodiment, the first trap 12 is disposed away from the gas vent valves 11a1. However, unless specifically stated otherwise, it is not essential that the first trap 12 be disposed away from the gas vent valves 11a1. For example, in the initial state, the first trap 12 may be in contact with the gas vent valves 11a1. When this is the case, the first trap 12 may also include such an embodiment in which the first trap 12 may be pressed and deformed by a gas vent valve 11a1 when the gas vent valve 11a1 opens. From such a viewpoint, in the battery module 100, a portion of the first trap 12 may be in contact with any of the gas vent valves 11a1 of the plurality of secondary batteries 11 of the battery module 100.

Second Trap 13

The second trap 13 is disposed further outward of the first trap 12 so as to oppose and cover the gas vent valve 11a1. The second trap 13 is a liquid retaining material made of a non-flammable material. The second trap 13 may be, for example, made of such a material as a spongy material, a mineral wool material, a diatomaceous earth, and a fibrous material. The second trap 13 may be disposed away from the first trap 12. The second trap 13 may be supported, for example, on the first trap 12 or the battery case 11a.

In the embodiment shown in FIG. 1, the first trap 12 and the second trap 13 are each attached to a support structure 14 that is attached to the battery case 11a. In addition, the first trap 12 is disposed away from the gas vent valve 11a1 by a predetermined distance. The second trap 13 may be disposed away from the first trap 12 by a predetermined distance. In this embodiment, the first trap 12 is disposed 2 cm above the gas vent valves 11a1. The second trap 13 is disposed 4 cm above the gas vent valve 11a1. The distance K1 from the gas vent valve 11a1 to the first trap 12 and the distance K2 from the gas vent valve 11a1 to the second trap 13 are not limited to the just-mentioned example, and may be varied appropriately. From this viewpoint, in the battery module 100 as well, the second trap 13 may be disposed away from the first trap 12 (see FIG. 3).

In this embodiment, for example, a clearance gap S1 is provided between the first trap 12 and the second trap 13. In this case, the gas discharged from the gas vent valve 11a1 passes through the first trap 12 and is discharged from the clearance gap S1 between the first trap 12 and the second trap 13. As a result, the gas can smoothly escape from the gas vent valve 11a1. Moreover, the second trap 13 is disposed adjacent to the first trap 12 spaced only by the clearance gap S1. Therefore, the misted electrolyte solution contained in the gas that has passed through the first trap 12 is trapped by the second trap 13. From such a viewpoint, the clearance gap S1 between the first trap 12 and the second trap 13 may be from about 5 mm to about 30 mm.

In this embodiment, the second trap 13 is disposed away from the first trap 12. However, unless specifically stated otherwise, it is not essential that the second trap 13 be disposed away from the first trap 12. For example, the gas that has passed through the first trap 12 may escape outside through a gap between the second trap 13 and the first trap 12. From this viewpoint, in the initial state, the second trap 13 may be in contact with the first trap 12. Also, the second trap 13 may be partially in contact with the first trap 12. In addition, in the case of the battery module 100, the gas discharged from the gas vent valve 11a1 and passed through the first trap 12 may be discharged outside through a gap between the second trap 13 and the first trap 12 in each of the plurality of secondary batteries 11 of the battery module 100. From such a viewpoint, an appropriate gap for releasing the gas may be provided between the first trap 12 and the second trap 13. A portion of the second trap 13 may be in contact with any of the first traps 12 of the plurality of secondary batteries 11 of the battery module 100. In addition, a spacer for retaining a gap may also be disposed between the first trap 12 and the second trap 13. Although not shown in the drawings, the spacer may be provided with a passage that allows gas to escape outside.

Moreover, in the battery module 100, the second trap 13 may be supported on at least one of the restraining member 102, the bus bars 104, and the first trap 12, and any of the battery cases 11a of the plurality of secondary batteries 11. In other words, the second trap 13 may be supported on the restraining member 102, the bus bars 104, the first trap 12, and so forth, not just on the battery cases 11a. Furthermore, as illustrated in FIG. 3, in the battery pack 200, the second trap 13 may be further attached to the pack case 202.

Moreover, in the case where the second trap 13 is supported on any of the battery cases 11a, the restraining member 102, the bus bars 104, and the pack case 202, the first trap 12 may be supported on the second trap 13. Furthermore, as illustrated in FIG. 3, in a case where the battery pack 200 encloses a plurality of battery modules 100, one first trap 12 and one second trap 13 may be provided in the battery pack 200 respectively for each one of the battery modules 100. Alternatively, in another case where the battery pack 200 encloses a plurality of battery modules 100, one first trap 12 and one second trap 13 may be provided in the battery pack 200 for all the plurality of the battery modules 100.

As has been described above, the battery unit 10 according to the present disclosure includes the secondary battery 11, the first trap 12, and the second trap 13, as illustrated in FIG. 1. The secondary battery 11 includes the battery case 11a provided with the gas vent valve 11a1, and an electrolyte solution enclosed in the battery case 11a. The first trap 12 includes a mesh material disposed outside the battery case 11a so as to oppose and cover the gas vent valve 11a1. The second trap 13 includes a liquid retaining material made of a non-flammable material and disposed further outward of the first trap 12 so as to oppose and cover the gas vent valve 11a1.

In the just-described battery unit 10, the first trap 12 and the second trap 13 serve to prevent scattering of the sparks and the electrolyte solution contained in the gas that is ejected when the gas vent valve 11a1 is opened. As a result, it is possible to improve safety against propagation of thermal runaway that occurs between batteries.

In addition, as illustrated in FIGS. 2 and 3, the battery module 100 disclosed herein includes the plurality of secondary batteries 11, the restraining member 102, the bus bars 104, the first trap 12, and the second trap 13. Each of the plurality of secondary batteries 11 includes the battery case 11a provided with the gas vent valve 11a1, an electrolyte solution enclosed in the battery case 11a, the positive electrode terminal 21 disposed on a side surface of the battery case 11a, and the negative electrode terminal 22 disposed on the side surface of the battery case 11a. The restraining member 102 restrains the plurality of secondary batteries 11 in a predetermined arrangement. The bus bar 104 connects a positive electrode terminal 21 and a negative electrode terminal 22 between the plurality of secondary batteries 11. The first trap 12 includes a mesh material disposed outside the battery case 11a of each of the plurality of secondary batteries 11 so as to oppose and cover the gas vent valve 11a1 of each of the plurality of secondary batteries 11. The second trap 13 includes a liquid retaining material made of a non-flammable material and disposed further outward of the first trap 12 so as to oppose and cover the gas vent valve 11a1 of each of the plurality of secondary batteries 11.

In the just-described battery module 100, the first trap 12 and the second trap 13 serve to prevent scattering of the sparks and the electrolyte solution contained in the gas that is ejected when the gas vent valve 11a1 is opened. As a result, it is possible to improve safety against the thermal runaway that originates from one of the secondary batteries 11 and propagates to other secondary batteries 11 in the battery module 100.

In addition, as illustrated in FIG. 3, the battery pack 200 according to the present disclosure may include one or more battery modules 100, and a pack case 202 enclosing the one or more battery modules 100 in a predetermined arrangement. The first trap 12 may be supported on at least one of the restraining member 102, the bus bars 104, the pack case 202, the second trap 13, and any of the battery cases 11a of the plurality of secondary batteries 11. The second trap 13 may be supported on at least one of the restraining member 102, the bus bars 104, the pack case 202, the first trap 12, and any of the battery cases 11a of the plurality of secondary batteries 11.

In the just-described battery pack 200, the first trap 12 and the second trap 13 serve to prevent scattering of the sparks and the electrolyte solution contained in the gas that is ejected when the gas vent valve 11a1 is opened. As a result, in the battery pack 200, it is possible to improve safety against the thermal runaway that originates from one of the secondary batteries 11 and propagates to other secondary batteries 11 in the battery pack 200.

For example, the effectiveness of the battery unit 10, the battery module 100, and the battery pack 200 as disclosed herein may be confirmed through the following abuse testing.

For example, a 5-cell module as shown in FIG. 2 is prepared. Then, a thermal propagation test is carried out, in which a nail penetrates into the central one of the cells and the resulting short circuit triggers thermal runaway.

For the thermal propagation test with nail penetration, a nail that has a shaft diameter of 6 mm and a tip angle of 60 degrees is prepared. Here, the nail is made of SUS440C stainless steel. The battery case 11a is made of aluminum, which can be penetrated by a nail. In the nail penetration test, the rate of nail penetration is set at 2 mm/second. Here, two or more types of battery cells with different types of electrolyte solution and different types of electrode assembly structure may be prepared. The staring SOC (state of charge) is set at 100%. The charge conditions that result in 100% SOC may be determined in advance respectively for the two types of battery cells.

Then, the test may be conducted respectively for a case in which neither the first trap 12 nor the second trap 13 is provided, for a case in which only the first trap 12 is provided, and for a case in which both the first trap 12 and the second trap 13 are provided. The first trap 12 may be made of, for example, a stainless steel mesh material. The second trap 13 may be made of, for example, glass wool.

According to the knowledge obtained by the present inventors, the just-described test makes it possible to confirm the effectiveness of the case in which both the first trap 12 and the second trap 13 are provided. According to the knowledge obtained by the present inventors, it has been confirmed that, in the case in which both the first trap 12 and the second trap 13 are provided, it is possible to reduce spraying of the electrolyte solution contained in the gas ejected from the central one of the cells which triggers propagation of thermal runaway, compared to the other cases, and it is also possible to prevent or delay propagation of thermal runaway in the battery module 100. Here, the battery unit 10 and the battery module 100 are considered to have higher safety when the battery module 100 shows a longer time until the battery module 100 causes thermal runaway propagation, and further, when the battery module 100 is able to prevent thermal runaway propagation more effectively.

Various embodiments of the battery unit, the battery module, and the battery pack have been described hereinabove according to the present disclosure. Unless specifically stated otherwise, the embodiments of the battery unit, the battery module, and the battery pack described herein do not limit the scope of the present invention.

The invention claimed is:

1. A battery unit comprising:
   a secondary battery;
   a first trap; and
   a second trap, wherein:
   the secondary battery includes:
      a battery case including a gas vent valve; and
      an electrolyte solution enclosed in the battery case;
   the first trap includes a mesh material disposed outside the battery case so as to oppose and cover the gas vent valve in a first direction;
   the second trap includes a liquid retaining material made of a non-flammable material and disposed further outward of the first trap in the first direction so as to oppose and cover the gas vent valve; and
   a clearance gap is directly between the first trap and the second trap in the first direction, the clearance gap configured to discharge gas, that passed through the first trap after being discharged from the gas vent valve, to an outside of the first trap and the second trap in a second direction that is perpendicular to the first direction.

2. The battery unit according to claim 1, wherein the first trap has an aperture ratio of from 25% to 75%.

3. The battery unit according to claim 1, wherein the second trap includes one of a spongy material, a mineral wool material, a diatomaceous earth, and a fibrous material.

4. The battery unit according to claim 1, wherein the first trap is disposed away from the gas vent valve.

5. The battery unit according to claim 1, wherein the first trap is supported on the battery case or the second trap.

6. The battery unit according to claim 1, wherein the second trap is supported on the first trap or the battery case.

7. A battery module comprising:
   a plurality of secondary batteries;
   a restraining member;
   bus bars;
   a first trap; and
   a second trap, wherein:
   each of the secondary batteries includes:
      a battery case including a gas vent valve;
      an electrolyte solution enclosed in the battery case;
      a positive electrode terminal disposed on a side surface of the battery case; and
      a negative electrode terminal disposed on the side surface of the battery case;
   the restraining member restrains the plurality of secondary batteries in a predetermined arrangement;
   each of the bus bars connects a positive electrode terminal and a negative electrode terminal between the plurality of secondary batteries;
   the first trap includes a mesh material disposed outside the battery case of each of the plurality of secondary batteries so as to oppose and cover the gas vent valve of each of the plurality of secondary batteries; and
   the second trap includes a liquid retaining material made of a non-flammable material and disposed further outward of the first trap so as to oppose and cover the gas vent valve of each of the plurality of secondary batteries.

8. The battery module according to claim 7, wherein the first trap has an aperture ratio of from 25% to 75%.

9. The battery module according to claim 7, wherein the second trap includes one of a spongy material, a mineral wool material, a diatomaceous earth, and a fibrous material.

10. The battery module according to claim 7, wherein the first trap is disposed away from the gas vent valve of each of the plurality of secondary batteries.

11. The battery module according to claim 7, wherein the second trap is disposed away from the first trap.

12. The battery module according to claim 7, wherein the first trap is supported on at least one of the restraining member, the bus bars, the second trap, and any of the battery cases of the plurality of secondary batteries.

13. The battery module according to claim 7, wherein the second trap may be supported on at least one of the first trap, the restraining member, the bus bars, and any of the battery cases of the plurality of secondary batteries.

14. A battery pack comprising:
one or more battery modules according to claim 7; and
a pack case enclosing the one or more battery modules in a predetermined arrangement.

15. The battery pack according to claim 14, wherein the first trap is supported on at least one of the restraining member, the bus bars, the pack case, the second trap, and any of the battery cases of the plurality of secondary batteries.

16. The battery pack according to claim 14, wherein the second trap is supported on at least one of the restraining member, the bus bars, the first trap, and any of the battery cases of the plurality of secondary batteries.

17. A battery module comprising:
a plurality of secondary batteries;
a first trap; and
a second trap, wherein:
each of the secondary batteries includes:
  a battery case including a gas vent valve; and
  an electrolyte solution enclosed in the battery case;
the first trap includes a mesh material disposed outside the battery case of each of the plurality of secondary batteries so as to oppose and cover the gas vent valve of each of the plurality of secondary batteries; and
the second trap includes a liquid retaining material made of a non-flammable material and disposed further outward of the first trap so as to oppose and cover the gas vent valve of each of the plurality of secondary batteries.

* * * * *